United States Patent
Briggs et al.

(10) Patent No.: US 12,043,124 B2
(45) Date of Patent: Jul. 23, 2024

(54) ISOLATION FAULT DETECTION ON DC CHARGE BUS

(71) Applicant: Ford Global Technologies, LLC, Dearborn, MI (US)

(72) Inventors: Graham Lynn Briggs, Ferndale, MI (US); Yuan Zhang, Canton, MI (US); Jonathan Andrew Butcher, Farmington, MI (US); Wai Hwa Fong, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 17/716,586

(22) Filed: Apr. 8, 2022

(65) Prior Publication Data

US 2023/0322087 A1 Oct. 12, 2023

(51) Int. Cl.
| | |
|---|---|
| *B60L 3/04* | (2006.01) |
| *B60L 50/60* | (2019.01) |
| *B60L 53/10* | (2019.01) |
| *H02J 7/00* | (2006.01) |
| *B60L 3/00* | (2019.01) |

(52) U.S. Cl.
CPC .............. *B60L 3/04* (2013.01); *B60L 50/60* (2019.02); *B60L 53/11* (2019.02); *H02J 7/0063* (2013.01); *H02J 7/0068* (2013.01); *B60L 3/0069* (2013.01)

(58) Field of Classification Search
CPC ........ H02J 7/0029; H02J 7/00045; H02J 7/02; H02J 2207/20; B60L 53/16; B60L 53/18; B60L 53/60; B60L 53/11; B60L 53/14; B60L 3/04; B60L 3/0069; G01R 31/1245; G01R 31/3835; G01R 31/52; Y02T 10/70; Y02T 10/7072; Y02T 90/12; Y02T 90/14

See application file for complete search history.

(56) References Cited

U.S. PATENT DOCUMENTS

| | | | |
|---|---|---|---|
| 9,702,917 B2 | 7/2017 | Gale et al. | |
| 10,114,058 B2 | 10/2018 | Sun | |
| 10,124,789 B2 | 11/2018 | Chang et al. | |
| 2013/0120883 A1* | 5/2013 | Yuno | B60L 53/00 361/42 |
| 2021/0237605 A1* | 8/2021 | Ando | B60L 53/60 |
| 2022/0063428 A1* | 3/2022 | Kamikihara | H02J 7/02 |
| 2022/0126724 A1* | 4/2022 | O'Connor | H02J 7/342 |
| 2022/0368140 A1* | 11/2022 | Ono | B60L 53/16 |
| 2022/0407320 A1* | 12/2022 | Filice | H01M 50/249 |

FOREIGN PATENT DOCUMENTS

| | | |
|---|---|---|
| CN | 102841299 A | 12/2012 |
| KR | 101171685 B1 | 8/2012 |
| TW | 201220631 A1 | 5/2012 |

* cited by examiner

*Primary Examiner* — Rexford N Barnie
*Assistant Examiner* — Terrence R Willoughby
(74) *Attorney, Agent, or Firm* — David B. Kelley; Brooks Kushman P.C.

(57) ABSTRACT

A vehicle power system includes at least one main switch to electrically connect a traction battery and electric machine, at least one DC charge switch to electrically connect the traction battery and a DC charge port when the at least one main switch is closed, and a controller to, while the DC charge port is disconnected from a DC power source, sequentially close the at least one DC charge switch and then the at least one main switch.

14 Claims, 3 Drawing Sheets

ISOLATION FAULT DETECTION ON DC CHARGE BUS

TECHNICAL FIELD

This disclosure relates to automotive power systems.

BACKGROUND

A vehicle that is powered by electrical energy may include a high voltage battery to store such energy. This battery may be charged from a DC power source or an AC power source. These DC and AC power sources may be off board the vehicle. Thus, the vehicle may include ports for electrically connecting the DC and/or AC power sources with the vehicle.

SUMMARY

A vehicle includes a traction battery, an electric machine, at least one main switch that electrically connects the traction battery and electric machine, a DC charge port that can be electrically connected with a DC power source, at least one DC charge switch that electrically connects the traction battery and DC charge port when the at least one main switch is closed, and a controller. The controller, while the DC charge port is disconnected from the DC power source, sequentially closes the at least one DC charge switch and then the at least one main switch.

A method includes, while a cover panel of a DC charge port of a vehicle is closed, sequentially closing at least one DC charge switch and then at least one main switch of the vehicle to electrically connect a traction battery of the vehicle and the DC charge port.

A vehicle power system includes at least one main switch that electrically connects a traction battery and electric machine, at least one DC charge switch that electrically connects the traction battery and a DC charge port when the at least one main switch is closed, and a controller that, while the DC charge port is disconnected from a DC power source, sequentially closes the at least one DC charge switch and then the at least one main switch.

While the DC charge port is connected to the DC power source, the controller may sequentially close the at least one main switch and then the at least one DC charge switch. The controller may prevent the electric machine from drawing power from the traction battery while the at least one DC charge switch and at least one main switch are closed. The controller may, only while the DC charge port is disconnected from the DC power source, sequentially close the at least one DC charge switch and then the at least one main switch. The DC charge port may include a cover panel. The controller may, while the DC charge port is disconnected from the DC power source and only while the cover panel is closed, sequentially close the at least one DC charge switch and then the at least one main switch. The at least one main switch may include two switches. The at least one DC charge switch may include two switches.

DETAILED DESCRIPTION

Figure 1A:
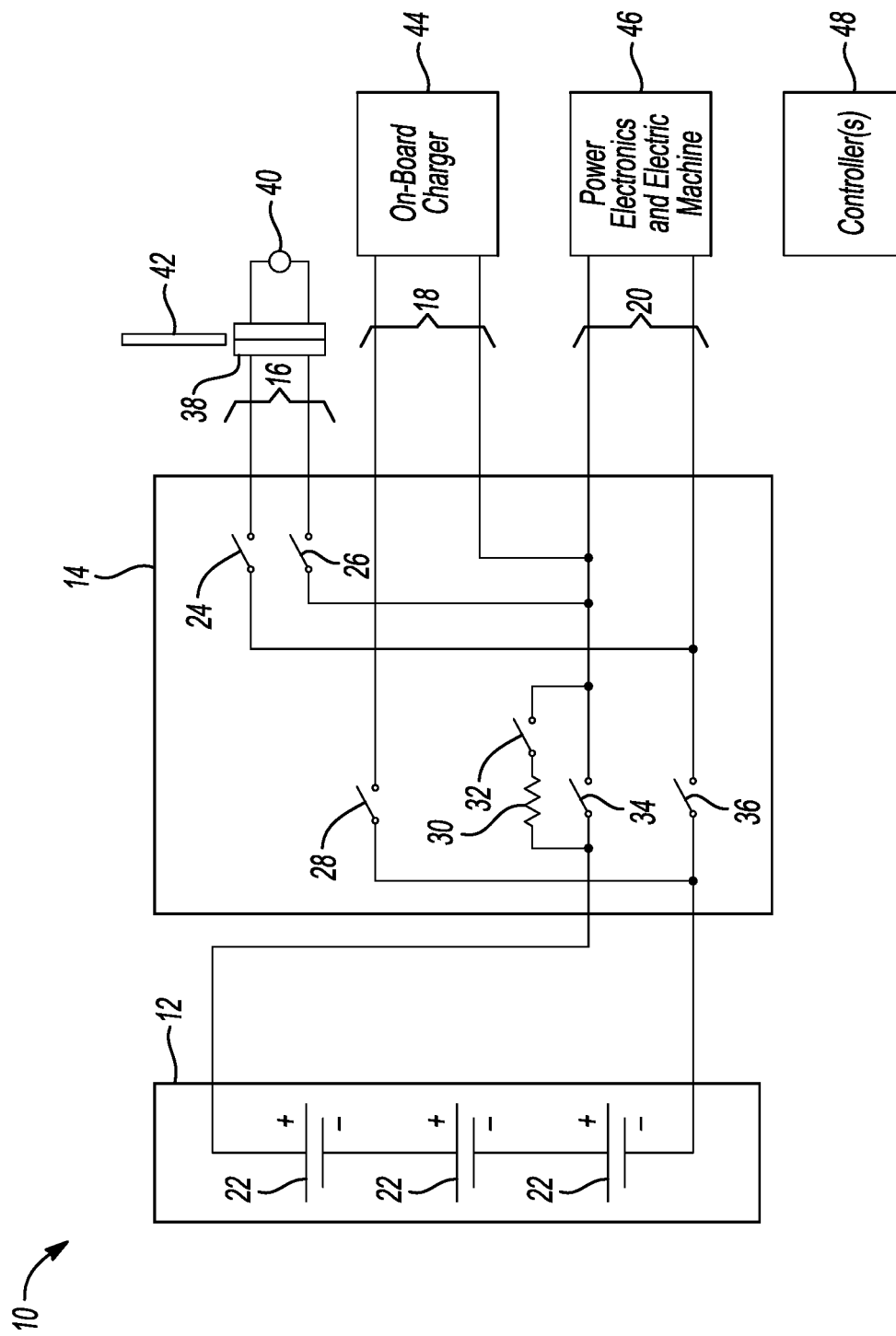
FIG. 1A is a schematic diagram of a vehicle power system with all switches being open.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Typically during DC charging of a vehicle, off board charger electric vehicle supply equipment (EVSE) performs the leakage detection. The EVSE, for example, may send a message indicating a leakage has been detected within the electric vehicle (EV)-EVSE system. The fault might be either in the EV or in the EVSE. While charging, if there is a leakage or isolation fault on the DC fast charge bus, the off board charger may set a fault and stop charging. To detect a fault on the DC fast charge bus, the DC fast charge switches and main switches need to close to enable the battery control module to perform isolation monitoring of the bus. Currently, the DC fast charge switches can only close when connected to an off board charger as part of the charging sequence due to various regulations concerning the high voltage port. The voltage at the port should be less than 60V before the charge cord of the EVSE can be unlocked. Also, only when the DC fast charge switches are open can voltage at the port exceed 60V.

It may thus be difficult to distinguish a leakage or isolation fault on the DC fast charge bus from a fault on the off board charger because the DC fast charge switches currently cannot close when off plug. Here, strategies are presented that provide for the closing of various switches while meeting existing requirements.

In one example, a fault code may indicate a potential leakage or isolation fault associated with either the DC fast charge bus or off board charger. A control routine request may be sent to a high power control module to maintain the module in a power-down state, and to keep other modules awake. This power-down state may be held for a calibratable period of time. While the high power control module is maintaining the power-down state, a battery energy control module enters a diagnostics session for access. A control routine request may then be sent to the battery energy control module.

The battery electric control module will enter the requested control routine if it is in the correct diagnostic session, there is no inhibit start, no restart fault, etc. present (except those related to isolation faults), the charge port door is closed, the contactor request from the high power control module is set to open, the torque status from the high power control module is not "On" and not "Torque Available," and the main and auxiliary switches are open.

After entering the active state of control routine, the battery energy control module will disable any DC/DC requests, check whether voltage is less than a calibratable value, sequentially close the auxiliary, main negative, DC charge negative, DC charge positive, pre-charge, and main positive (after pre-charge complete) switches, open the pre-charge switch, and enable leakage detection functionality.

The battery electric control module will exit the control routine if an inhibit start fault or no restart fault is present (except for isolation faults), it receives a routine stop request from an external tester, or the charge port door is opened. When the battery electric control module exist that control routine, it will open all the switches.

Upon routine completions, both routines may exit. If an isolation fault is present on the DC fast charge bus, the battery energy control module may set a fault code. In the preceding example, the charge port door must be closed. Otherwise, the routines will terminate.

Referring to FIG. 1A, an example power system 10 includes a traction battery 12, a bussed electrical center 14, a DC charge bus 16, an auxiliary bus 18, and a traction bus 20. The bussed electrical center 14 is electrically connected between the traction battery 12, and the busses 16, 18, 20.

The traction battery 12 includes a plurality of series connected cells 22. The bussed electrical center 14 includes positive and negative DC charge switches 24, 26, negative auxiliary switch 28, pre-charge resistor 30, pre-charge switch 32, and positive and negative main switches 34, 36. The positive and negative DC charge switches 24, 26 are components of the DC bus 16. The negative auxiliary switch 28 is a component of the auxiliary bus 18. The pre-charge resistor 32 and pre-charge switch 34 are series connected, and are in parallel with the positive main switch 36. The positive and negative main switches 34, 36 are components of the traction bus 20. The DC bus 16 is thus electrically connected with the traction bus 20 such that the positive and negative main switches 34, 36 are electrically between the traction battery 12 and DC bus 16, and the DC bus 16 terminates with a DC charge port 38.

The DC charge port 38 is arranged to be electrically connected with a DC power source 40. Moreover, the DC charge port 38 may include a moveable cover panel 42 that, depending on its position, conceals or reveals connecting terminals of the DC charge port 38. The auxiliary bus 18 is electrically connected with on-board charging equipment 44. The traction bus is electrically connected with power electronics and electric machine 46. The power system 10 further includes one or more controllers 48 that are in communication with and/or control the above described components of the power system 10. Vehicle networks (e.g., wired, wireless, etc.) facilitate such communication and/or control in standard fashion.

When the DC charge switches 24, 26 and main switches 34, 36 are closed, power may flow from the DC power source 40 to the traction battery 12. When the auxiliary switch 28 and main positive switch 34 are closed, power may flow from the on-board charging equipment 44 to the traction battery. When the main switches 34, 36 are closed, power may flow from the traction battery 12 to the power electronics and electric machine 46.

During DC fast charging, the DC power source 40 is electrically connected with the DC charge port 38, and the cover panel 42 is in the open position. To enable power flow between the DC power source 40 and the traction battery, the controllers 48 command the pre-charge and negative main switches 32, 36 to close, followed by the positive main switch 34, and finally the negative and positive DC charge switches 24, 26.

To enable power flow between the on-board charger 44 and traction battery during AC charging, the controllers 48 command the negative auxiliary and pre-charge switches 28, 32 to close, followed by the positive main switch 34.

To enable power flow between the traction battery 12 and power electronics and electric machine 46, the controllers 48 command the pre-charge and negative main switches 32, 36 to close, followed by the positive main switch 34.

To facilitate detection of a leakage or isolation fault on the DC bus 16, the controllers 48 may first determine via standard sensors, communication links, or the like whether the DC power source 40 is electrically connected with the DC charge port 38, and/or whether the cover panel 42 is in the closed position. Depending on criteria, either or both may be required.

Provided the DC power source 40 is disconnected from the DC charge port 38, the controllers 48 may command the negative and positive DC charge switches 24, 26 to close, followed by the pre-charge and negative main switches 32, 36, and then the positive main switch 34. As such, the traction battery 12 and DC charge port 38 may be electrically connected, even though the DC power source 40 is disconnected from the DC charge port 38. During these operations, the controllers 48, may (or may not) prevent the power electronics and electric machine 46 from drawing power from the traction battery 12, as requirements dictate.

Figure 1B:
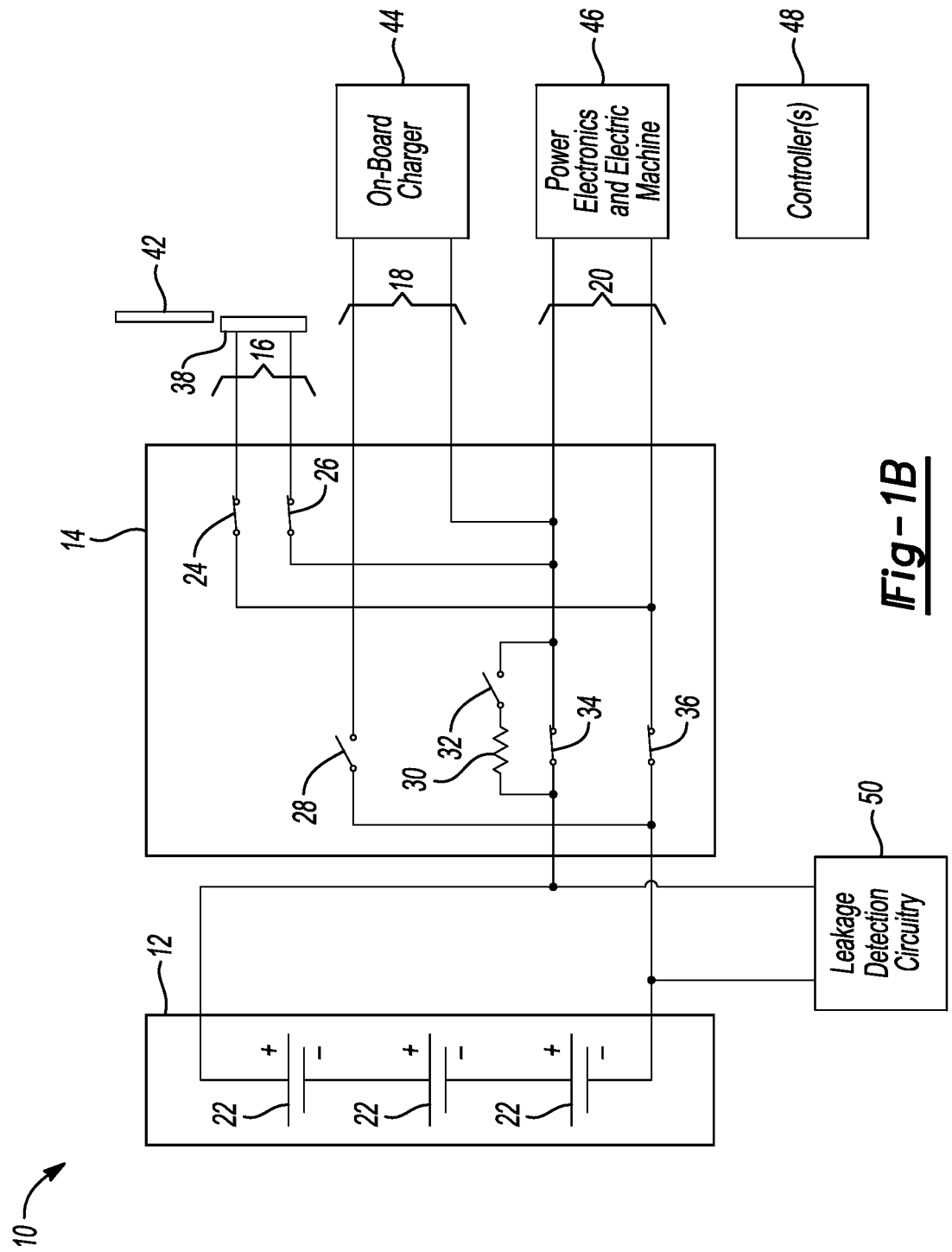
FIG. 1B is a schematic diagram of the vehicle power system of FIG. 1A with certain switches closed and being electrically connected with leakage detection circuitry.

Referring to FIG. 1B, once the traction battery 12 and DC charge port 38 are electrically connected as described above, the controllers 48 may electrically connect typical leakage detection circuitry 50 across the positive and negative terminals of the traction battery 12. This arrangement thus permits the controllers 48 to detect leakage or an isolation fault on the DC bus 16. The controllers 48 may take certain remedial actions, such as preventing use of the DC bus 16 for DC fast charging, until indication of proper service is present.

Figure 2:
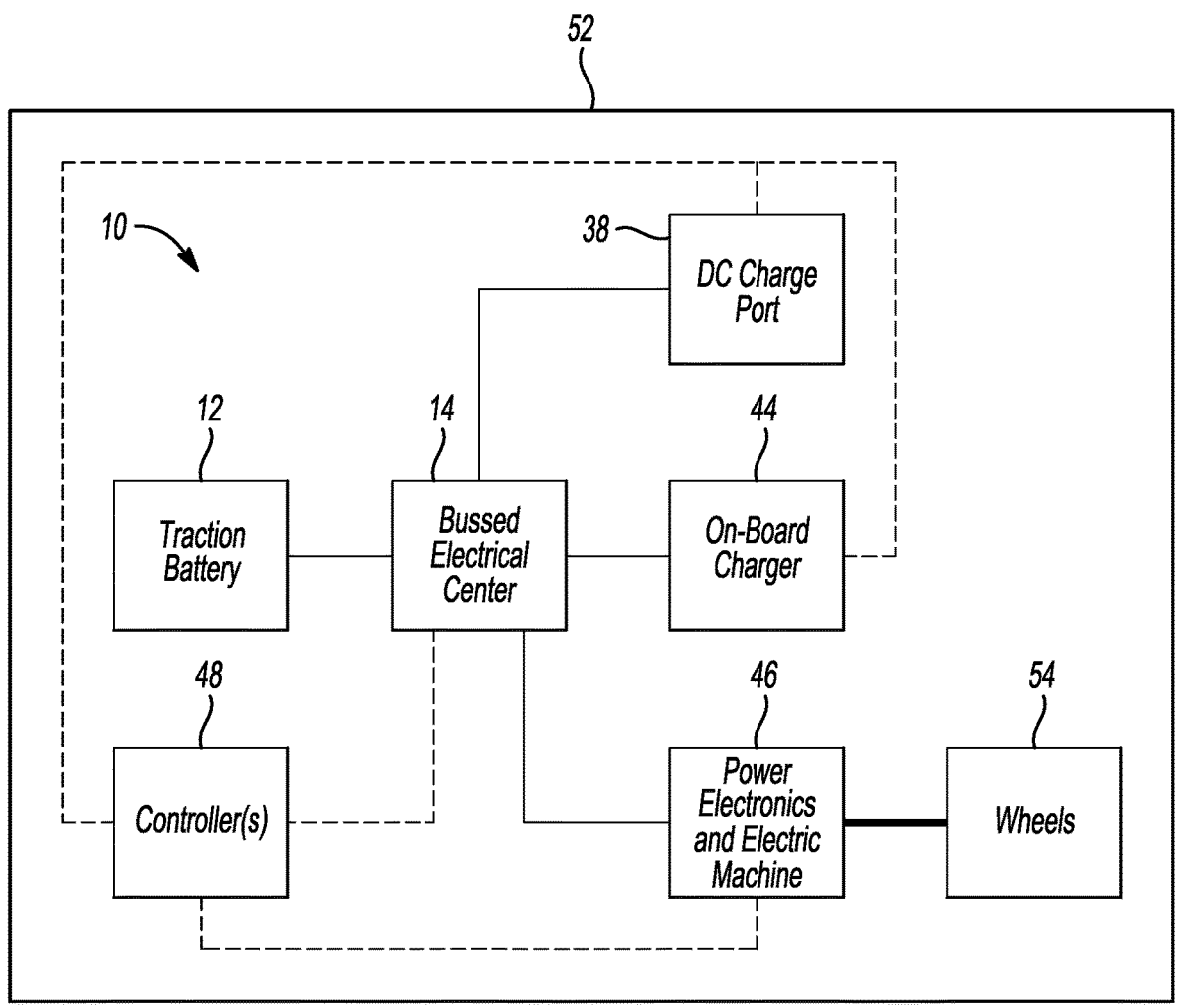
FIG. 2 is a schematic diagram of the vehicle power system of FIGS. 1A and 1B within the context of a vehicle.

Referring to FIG. 2, the power system 10 is shown within the context of vehicle 52, which includes wheels 54. Electrical connections are shown in thin solid line, mechanical connections are shown in thick solid line, and communication links are shown in dashed line. The electric machine of the power electronics and electric machine 46 is arranged to transform electrical energy from the traction battery 12 to mechanical energy to propel the wheels 54. Likewise, during regenerative braking, the electric machine is arranged to transform mechanical energy from the wheels 54 to electrical energy for storage in the traction battery 12. Other operating scenarios are also possible.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words controller and controllers may be interchanged herein. Also, the word switch contemplates contactor(s), field effect transistor(s), and other electrical disconnect devices.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a traction battery;
   an electric machine;
   at least one main switch configured to electrically connect the traction battery and electric machine;
   a DC charge port configured to be electrically connected with a DC power source;
   at least one DC charge switch configured to electrically connect the traction battery and DC charge port when the at least one main switch is closed; and
   a controller programmed to, while the DC charge port is disconnected from the DC power source, sequentially close the at least one DC charge switch and then the at least one main switch to electrically connect the traction battery and DC charge port.

2. The vehicle of claim 1, wherein the controller is further programmed to, while the DC charge port is connected to the DC power source, sequentially close the at least one main switch and then the at least one DC charge switch.

3. The vehicle of claim 1, wherein the controller is further programmed to prevent the electric machine from drawing power from the traction battery while the at least one DC charge switch and at least one main switch are closed.

4. The vehicle of claim 1, wherein the controller is further programmed to, only while the DC charge port is disconnected from the DC power source, sequentially close the at least one DC charge switch and then the at least one main switch.

5. The vehicle of claim 1, wherein the DC charge port includes a cover panel and wherein the controller is further programmed to, while the DC charge port is disconnected from the DC power source and only while the cover panel is closed, sequentially close the at least one DC charge switch and then the at least one main switch.

6. The vehicle of claim 1, wherein the at least one main switch includes two switches.

7. The vehicle of claim 1, wherein the at least one DC charge switch includes two switches.

8. A vehicle power system comprising:
   at least one main switch configured to electrically connect a traction battery and electric machine;
   at least one DC charge switch configured to electrically connect the traction battery and a DC charge port when the at least one main switch is closed; and
   a controller programmed to, while the DC charge port is disconnected from a DC power source, sequentially close the at least one DC charge switch and then the at least one main switch.

9. The system of claim 8, wherein the controller is further programmed to, while the DC charge port is connected to the DC power source, sequentially close the at least one main switch and then the at least one DC charge switch.

10. The system of claim 8, wherein the controller is further programmed to prevent the electric machine from drawing power from the traction battery while the at least one DC charge switch and at least one main switch are closed.

11. The system of claim 8, wherein the controller is further programmed to, only while the DC charge port is disconnected from the DC power source, sequentially close the at least one DC charge switch and then the at least one main switch.

12. The system of claim 8, wherein the DC charge port includes a cover panel and wherein the controller is further programmed to, while the DC charge port is disconnected from the DC power source and only while the cover panel is closed, sequentially close the at least one DC charge switch and then the at least one main switch.

13. The system of claim 8, wherein the at least one main switch includes two switches.

14. The vehicle of claim 8, wherein the at least one DC charge switch includes two switches.

* * * * *